United States Patent
Lane et al.

(10) Patent No.: US 7,985,493 B2
(45) Date of Patent: Jul. 26, 2011

(54) HIGH TEMPERATURE INSULATION AND INSULATED ARTICLE

(75) Inventors: Jay E. Lane, Mims, FL (US); Christian X. Campbell, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 1357 days.

(21) Appl. No.: 11/516,324

(22) Filed: Sep. 6, 2006

(65) Prior Publication Data

US 2011/0151239 A1    Jun. 23, 2011

Related U.S. Application Data

(63) Continuation-in-part of application No. 10/667,737, filed on Sep. 22, 2003, now Pat. No. 7,108,925.

(51) Int. Cl.
*B32B 9/00* (2006.01)

(52) U.S. Cl. ........................................ 428/701

(58) Field of Classification Search .................. 428/698, 428/701
See application file for complete search history.

(56) References Cited

U.S. PATENT DOCUMENTS

| | | | |
|---|---|---|---|
| 4,552,852 A | 11/1985 | Manning | |
| 5,419,971 A | 5/1995 | Skelly et al. | |
| 5,985,470 A | 11/1999 | Spitsberg et al. | |
| 6,013,592 A | 1/2000 | Merrill et al. | |
| 6,074,706 A | 6/2000 | Beverley et al. | |
| 6,106,959 A | 8/2000 | Vance et al. | |
| 6,197,424 B1 | 3/2001 | Morrison et al. | |
| 6,287,511 B1 | 9/2001 | Merrill et al. | |
| 6,558,814 B2 | 5/2003 | Spitsberg et al. | |
| 6,733,908 B1 | 5/2004 | Lee et al. | |
| 6,929,852 B2 | 8/2005 | Lane et al. | |
| 7,001,679 B2 | 2/2006 | Campbell et al. | |
| 2002/0009609 A1 | 1/2002 | Ritter et al. | |
| 2003/0035907 A1 | 2/2003 | Campbell et al. | |
| 2006/0121293 A1 | 6/2006 | Boutwell et al. | |
| 2006/0121295 A1 | 6/2006 | Boutwell et al. | |

*Primary Examiner* — David R Sample
*Assistant Examiner* — Daniel Miller

(57) ABSTRACT

An insulation (10, 100) and an insulated article (40, 56, 62, 82) having improved properties for use in a high temperature combustion environment. The improved insulation may include composite particles (18) of alumina and zirconia-hafnia exhibiting micro-cracks that remain contained within the particles and do not extend into a surrounding binder material. The improved insulation may be a vapor resistance layer (VRL) top coat (80) disposed over a layer of mullite-based ceramic thermal insulation (72) and may be anchored to the thermal insulation by extending into pits (79) formed in the surface (S') of the mullite-based insulation. Porosity and thickness of the top coat may be controlled to provide compatibility between the elastic modulus of the zirconia-hafnia top coat and that of the underlying mullite-based insulation.

15 Claims, 4 Drawing Sheets

HIGH TEMPERATURE INSULATION AND INSULATED ARTICLE

This application is a continuation-in-part of U.S. patent application Ser. No. 10/667,737 filed on Sep. 22, 2003 now U.S. Pat. No. 7,108,925.

FIELD OF THE INVENTION

This invention relates generally to the field of materials and more particularly to ceramic materials adapted for use in high temperature environments.

BACKGROUND OF THE INVENTION

Components of gas turbine engines are exposed to an environment containing high temperature, high pressure, high velocity combustion gases containing moisture, oxygen and other corrosive compounds. Modern gas turbine engines may have firing temperatures that exceed 1,600° C., and temperatures of 1,600-1,900° C. are expected as the demand for even more efficient engines continues. Cobalt and nickel base superalloys are used to form many gas turbine components, but even these superalloy materials must be aggressively cooled and/or insulated from the hot gas flow in order to survive long term operation in the combustion environment.

The high temperature ranges of future advanced turbine engines will require higher temperature capable materials such as ceramic matrix composites (CMCs). Simultaneously, a coolant usage reduction is being required for these advanced engines while at the same time the temperature of the available coolant is rising, making it more difficult to cool metal structures. CMC materials with their higher temperature capability will still require cooling but much less than needed for superalloys. Calculations, validated by rig testing, show that current oxide-based CMC materials with oxide-based thermal insulation (FGI: friable graded insulation) need less than 10% of the cooling air required for a superalloy. Non-oxide CMC materials with protective coatings need 20-30% of the cooling air required for a superalloy, which is 2×-3× the cooling air needed for an oxide-based CMC material system.

Ceramic matrix composite materials have many potential applications in high temperature environments due to their ability to withstand and operate at higher temperatures and with less cooling than that of current superalloy parts in gas turbines. However, CMC's can survive temperatures in excess of 1,200° C. for only limited time periods in a combustion environment due to environmental degradation caused by the presence of water vapor in the combustion gas stream. Furthermore, nonoxide-based CMCs are also subject to oxidation that further limits their useful life. Non-oxide based CMCs can be aggressively cooled to withstand temperatures above 1200° C., but require a protective environmental barrier coating (EBC) system because they are subject to both oxidation attack and environmental degradation due to water vapor that limits their useful life.

Current nonoxide CMC technology for gas turbine engines relies on silicon-based materials. Silicon-based non-oxides such as silicon carbide (SiC) and silicon nitride ($Si_3N_4$) are subject to both oxidation and attack by high temperature, high pressure water vapor in a combustion product environment. In this dual degradation mechanism, the silicon carbide or silicon nitride is oxidized to form a thermally grown oxide ($SiO_2$) layer. This oxide layer then reacts with the high temperature, high pressure water vapor to form a volatile hydroxide species [$Si(OH)_x$] which is then lost to the environment. Thus, surface recession occurs in a continual process as the protective $SiO_2$ layer forms the hydroxide and volatilizes, and the new Si-based nonoxide ceramic surface oxidizes to replenish the lost $SiO_2$. This process is enhanced by the high velocity gas stream in a gas turbine environment and is further enhanced at higher temperatures, pressures and water vapor contents.

Accordingly, multi-layer environmental barrier coating systems have been developed to protect silicon-based nonoxide CMCs. Typically these systems have a minimum of three layers on the nonoxide CMC substrate. These layers typically comprise a bondcoat layer, typically silicon, at least one intermediate layer to improve thermal expansion compatibility between the bond coat and the top coat, and lastly the top coat that provides some degree of water vapor degradation resistance. Such multilayer systems have been developed to protect silicon-based non-oxide ceramics from the combustion environment. U.S. Pat. No. 5,391,404 describes a process for coating a silicon-based ceramic with mullite, and U.S. Pat. No. 5,985,470 describes a barium strontium aluminosilicate (BSAS) bond coat underlying a thermally insulating top coat over a silicon carbide containing substrate. U.S. Pat. No. 6,969,555 B2 describes a multi-layer EBC system where the top EBC layer is an alkaline earth metal aluminate or a rare earth aluminate. These EBC's multi-layer systems typically function at a maximum surface temperature of 1,200-1,350° C. Since growth of a silicon dioxide layer underneath the multi-layer environmental barrier coating system could result in spalling of the coating and loss of environmental protection, the environmental barrier coating material must be sufficiently dense to prevent the ingress/diffusion of oxygen through the coating; for example having only closed porosity of no more than approximately 10% and having no open porosity.

Current oxide-based CMC's can not be cooled effectively with active cooling systems due to their low thermal conductivity and need a thermal protective layer for use at extended times (1000's of hours) above 1200° C., such as described in U.S. Pat. No. 6,013,592. This thermal protective layer known as FGI (friable graded insulation) is typically an alumina-mullite oxide material that is thermally stable in oxidizing environments up to about 1800° C. FGI can generally withstand combustion engine environments up to 1400° C. However, in combustion environments with high water vapor contents greater than about 10% and/or temperatures that exceed 1400° C., the FGI will be subject to degradation caused by the water vapor. The degradation mechanism is dependent on the operating temperature. Initially, degradation will occur from the water vapor reacting with the silica constituent of the mullite phase and forming a gaseous silicon hydroxide. This gas species is swept away by the gas stream and material is lost from the FGI. This loss of silica can weaken local areas of the FGI surface, which may be subjected to erosive forces from the high velocity gas stream. This process, over time, can result in recession of the FGI thermal protective layer. At higher temperatures, above about 1450° C., the alumina constituent of FGI may be subject to reaction with water vapor and the formation of a gaseous aluminum hydroxide species. This process will also contribute to recession/erosion of the FGI.

For each of the above degradation mechanisms, the specific rate of reactions are highly dependent on the combustion gas temperature, engine pressure, gas velocity, and the partial pressure of water vapor. The prevention, or minimization, of these mechanisms requires the use of some cooling (to reduce the reaction temperatures thus reducing the reaction rates) and/or the application of a protective coating, such as known hermetic environmental barrier coatings (EBC).

BRIEF DESCRIPTION OF THE DRAWINGS

The invention will be more apparent from the following description in view of the drawings that show.

DETAILED DESCRIPTION OF THE INVENTION

Improved performance of a mullite-based insulation in a gas turbine engine environment is achieved by the present invention which provides, in one embodiment, a vapor resistance layer (VRL), as defined further below, of zirconia-hafnia having a controlled degree of porosity and a controlled thickness applied to an improved surface of the insulation.

The present inventors have found that a solid solution of zirconia-rich hafnia (Zr:$HfO_2$) may be used to provide an improved ceramic insulating material with improved resistance to gas turbine environments, specifically water vapor attack. Zirconia-hafnia may be incorporated into the bulk of an insulating material, such as being used as a filler material, or it may be disposed as a vapor resistance layer on a top surface of an insulating material.

Figure 1:
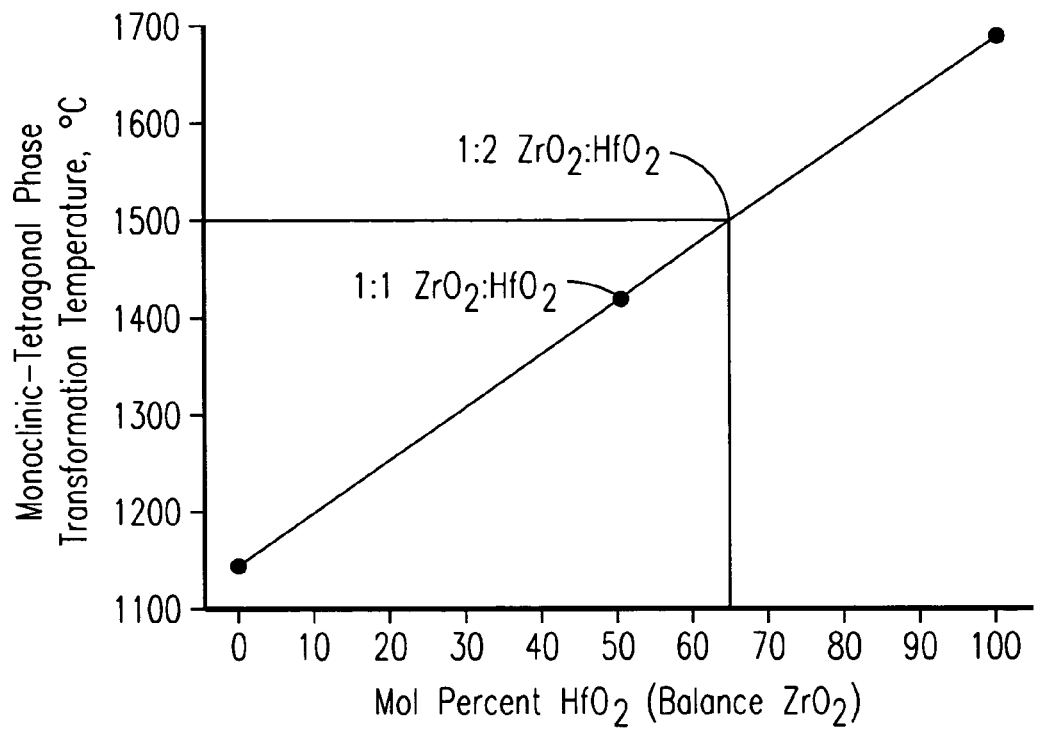
FIG. 1 is a graph of the relationship of the monoclinic-tetragonal phase transformation temperature to the mole percentage of hafnia in zirconia-hafnia, as is known in the art.

Hafnium occurs naturally only in zirconium minerals. Solvent extraction methods are used to separate the two metals, and pure hafnia ($HfO_2$) is known to be expensive. The monoclinic-tetragonal phase transformation temperature of zirconia-hafnia will increase approximately linearly from about 1,140° C. for pure zirconia to about 1,690° C. for pure hafnia, as shown in FIG. 1. The present invention exploits this relationship in a balance against cost effectiveness by utilizing zirconia-hafnia having a mole percentage of hafnia that is appropriate for various applications.

Figure 2:
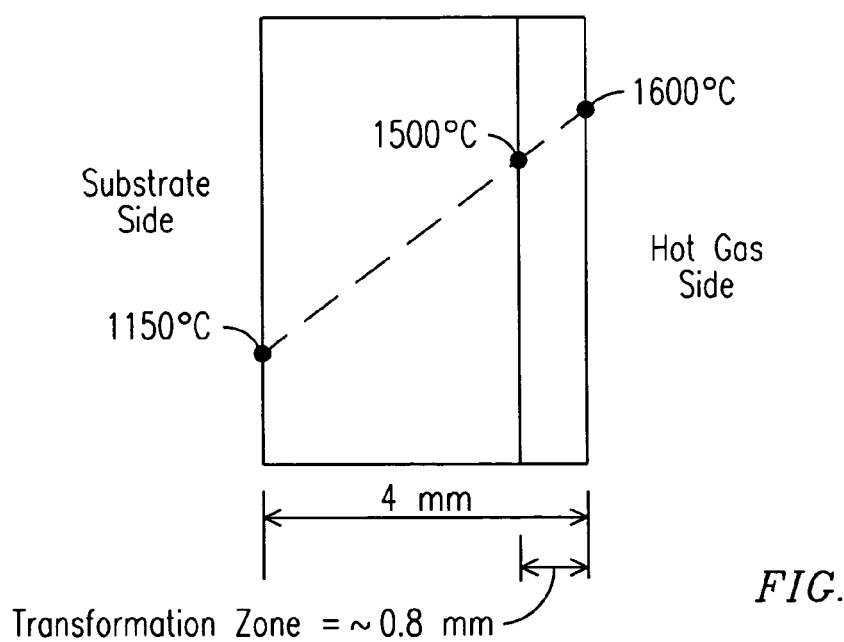
FIG. 2 is a cross-sectional view of a layer of ceramic insulation illustrating the temperature of the material as a function of the distance from the hot side surface.

It is generally desirable to avoid a phase transformation in an insulating material over the operating temperature range of the material in order to avoid the volume change associated with the phase change. Also, the monoclinic phase of zirconia and hafnia is the desired phase for thermal insulation applications, i.e. low thermal expansion and low elastic modulus. If a phase transformation does occur, the transforming material should be remote from the interface between the insulating material and the underlying substrate material in order to avoid spalling of the insulation. FIG. 2 illustrates the peak temperature that may be experienced in an example ceramic thermal insulation material in a 1,600° C. environment, such as may be experienced in a gas turbine engine. The temperature of the insulation material varies in this example from 1,600° C. at the hot gas surface to 1,150° C. on the substrate material side. For a 4 mm thick layer, only the top 20% of the material is exposed to a temperature greater than 1,500° C. If a phase transformation is permitted to occur throughout no more than 20% of the thickness of the material remote from the substrate material at a predetermined use temperature, it should be sufficiently isolated from the insulation/substrate interface to minimize the concern for spalling. Referring back to FIG. 1, it may be appreciated that a 1:2 ratio of zirconia/hafnia (66 mol % hafnia) provides a transformation temperature of 1,500° C. Accordingly, if 1:2 zirconia-hafnia were used as a constituent part of this example thermal insulation material, the zirconia-hafnia would remain in the monoclinic phase throughout the coolest 80% of the insulation depth, which is the region closest to the substrate/insulation interface. The volume change associated with the phase change in the hottest 20% of the insulation may not create an unacceptable level of stress at the insulation/substrate interface, particularly, when also combined with the porosity of the insulation material, which acts to block crack propagation and to increase the compliance of the insulation material. While other applications may involve different peak temperatures, insulation thicknesses, mechanical sensitivity to a phase change, etc., the present inventors believe that zirconia-hafnia containing at least 20 mol % and less than 100 mol % hafnia, or in the range of 50-95 mol % hafnia, or 60-75 mol % hafnia, would provide a useful balance between cost and performance when used in gas turbine applications.

To appreciate the benefit of using zirconia-hafnia in an insulation material composition, a comparison is made to an example prior art insulation material similar to those compositions described in U.S. Pat. Nos. 6,013,592 and 6,197,424, both incorporated by reference herein. This prior art insulation material may be co-processed with an oxide-oxide ceramic matrix composite (CMC) substrate material sold under the brand name A/N720-1 by COI Ceramic, Inc. of San Diego, Calif. A/N720-1 material utilizes Nextel™ N720 fibers (85% alumina and 15% silica in the form of mullite and alumina polycrystals) disposed in an alumina matrix. A protective layer of thermally insulating material is used to protect A/N720-1 material from the hot combustion gas within a gas turbine engine.

The example prior art insulation may be formed of the following composition:
- a plurality of hollow mullite shapes, such as for example spheres having diameters ranging from approximately 0.4-1.8 mm
- alumina and/or mullite filler particles of less than 30 microns
- a binder of aluminum hydroxychloride with alumina particles of less than 1 micron.

The aluminum hydroxychloride is an alumina precursor that enhances the sinterability of the alumina binding matrix between the mullite spheres and the filler particles.

Figure 3:
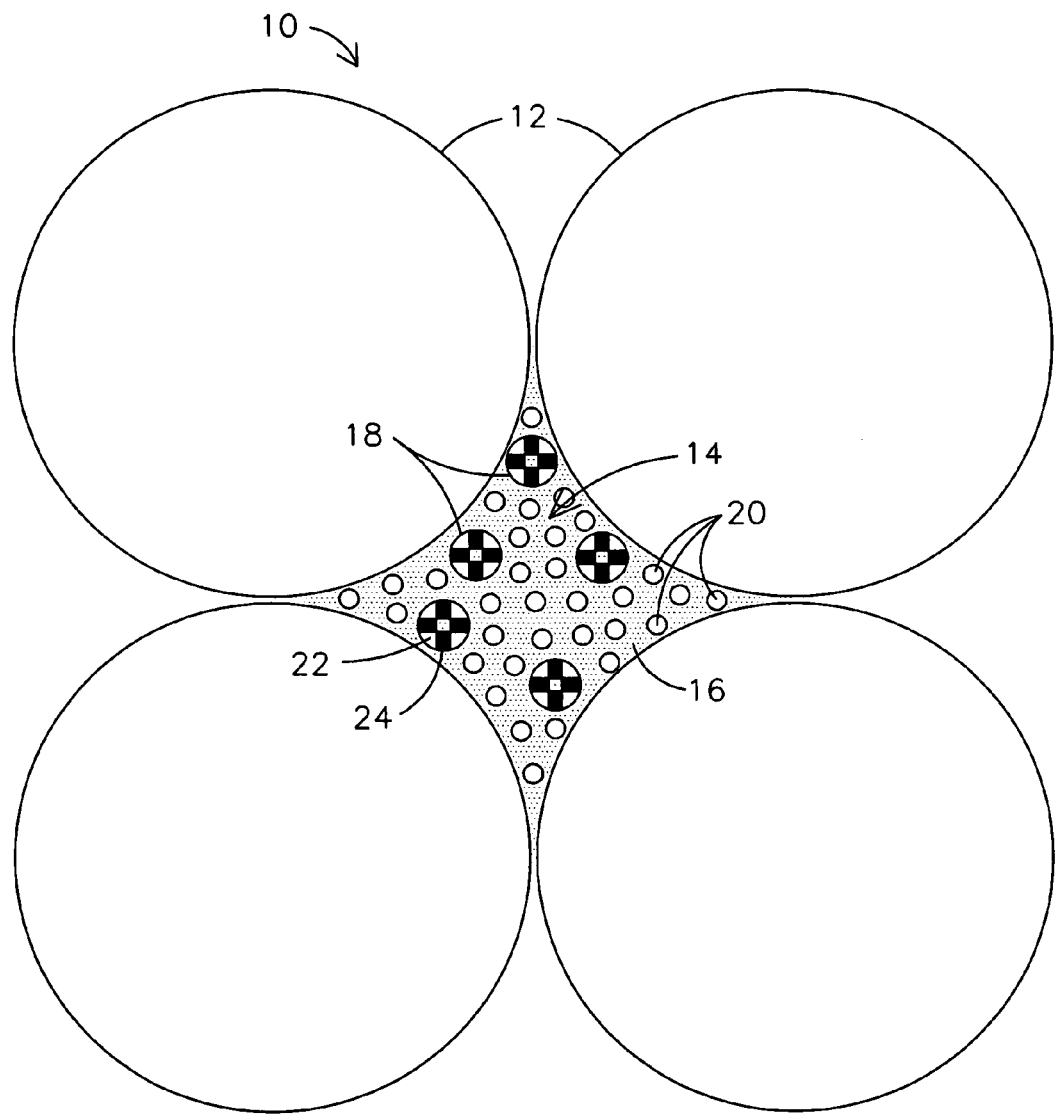
FIG. 3 is an illustration of the constituent parts of a thermal insulation including a composite powder containing zirconia-hafnia.

One exemplary embodiment of the present invention replaces at least some of the alumina and/or mullite filler particles of the prior art material with zirconia-hafnia. FIG. 3 is a highly magnified partial cross-section view of such high temperature insulation 10. Insulation 10 includes a plurality of oxide shapes 12 such as the illustrated hollow spheres, a filler powder material 14, and a binder matrix material 16 partially filling gaps between the hollow oxide spheres 12 and the filler powder 14. The oxide shapes 12 may be hollow, essentially solid or porous. In one embodiment they may be hollow mullite spheres having diameters ranging from approximately 0.4-1.8 mm. The other materials of the composition may separate the spheres 12 from each other, or if improved dimensional stability is desired, each sphere 12 may be in contact with one or more other spheres 12. The binder material 16 may be byproduct of aluminum hydroxychloride and an alumina powder having particle sizes less than 1 micron.

The filler powder 14 includes composite particles 18 and alumina particles 20. In other embodiments the filler powder 14 may include at least one of the group consisting of: $HfSiO_4$, $ZrSiO_4$, $Y_2Si_2O_7$, $Y_2O_3$, $ZrO_2$, $HfO_2$, yttria and or rare earth (RE) partially or fully stabilized $ZrO_2$, yttria and or RE partially or fully stabilized $HfO_2$, yttria and or RE partially or fully stabilized $ZrO_2/HfO_2$, yttrium aluminum garnet (YAG); RE silicates of the form $RE_2Si_2O_7$; RE oxides of the form $RE_2O_3$; RE zirconates or hafnates of the form $RE_4Zr_3O_{12}$ or $RE_4Hf_3O_{12}$, where RE may be one or more of Ce, Pr, Nd, Sm, Eu, Gd, Tb, Dy, Ho, Er, Tm, Yb, Lu, depending upon the performance requirements of the particular application.

In one embodiment, the composite particles 18 include a first constituent of alumina 22 and a second constituent of monoclinic zirconia-hafnia 24. The composite particles 18 of the present invention may be used to replace some or all of the alumina and/or mullite filler particles in prior art ceramic insulation compositions. The proportion of zirconia-hafnia 24 in the composite particles 18 may range anywhere from greater than 0% up to 100%. The elastic modulus of the composite particles 18 will vary with the ratio of the two constituents. Although experimental data is not available to the present inventors, it is expected that an alumina content of approximately 20-50 mol % will reduce the elastic modulus of the composite particles 18 to close to that of mullite (approximately 150 GPa). As described above, the mole percentage of hafnia in the zirconia-hafnia 24 may range from 50-95 mol % depending upon the requirements of the particular application.

Monoclinic zirconia-rich hafnia powder is made by a chemical process and the particle size is relatively fine, typically ranging from 1-5 microns. Such fine particles may become situated between particles of the binder material 16 and may result is a fairly weak matrix. Furthermore, fine filler powder particles could migrate to the insulation/substrate interface and may prevent a good bond. A larger composite filler particle average size, such as at least 30 microns or in the range of 30-50 microns or 10-100 microns, may be desired. Accordingly, the as-processed zirconia-hafnia powder may be post-processed to obtain a powder size that is more suitable as a filler powder. Spray-drying a zirconia-hafnia:alumina powder and firing the powder at a high temperature to obtain a thermally stable powder may accomplish this. It may be necessary to control the temperature regiment to be certain that the material remains primarily in a monoclinic phase. The powder is than milled to a desired mesh size, perhaps having an average composite particle size of between 10-100 microns in various embodiments. The composite powder particles 18 can be pre-fired at a temperature close to the expected operating temperature in order to stabilize the microstructure of the particles 18 and to ensure that the composite is dimensionally stable when used within insulation 10. The alumina 22 in the composite particles 18 forms a strong bond with the alumina binder material 16.

While experimental data is not yet available, the filler powder 14 containing alumina and zirconia-hafnia composite particles 18 is expected to provide insulation 10 with performance characteristics that compare favorably to those of the prior art insulations utilizing alumina and/or mullite filler powders. The composite particles 18 may exhibit micro-cracking within the particles themselves due to differential thermal expansion between the two particle constituents 22, 24. Such micro-cracking may occur during the high firing of the particles before the insulation composition is formed, during the firing of the insulation composition, and/or during the use of the insulation 10 in a high temperature environment. Advantageously, this micro-cracking damage is contained within the discreet volume of the composite particles 18 and does not have a tendency to propagate throughout the entire material matrix. This micro-cracking and the inherent properties of the monoclinic zirconia-hafnia should contribute to the relatively lower thermal conductivity and low elastic modulus of the insulation 10. Insulation 10 is expected to exhibit improved toughness and thermal shock performance when compared to similar prior art materials utilizing only alumina and/or mullite filler particles. Insulation 10 should also be less vulnerable to high temperature water vapor attack than prior art materials utilizing mullite fillers due to the inherent properties of zirconia and hafnia. It is expected that these improvements may be achieved with only minimal processing changes from the prior art. Insulation 10 should also be chemically compatible with A/N720-1 CMC material and may be co-processed therewith as a protective insulating layer disposed on an A/N720-1 CMC substrate. A limiting factor in the use of monoclinic zirconia-hafnia powders is the high cost of hafnia. The present inventors have reduced this cost impact in the exemplary embodiment by using zirconia-rich hafnia 24 and also by forming a composite powder 18 with alumina 22 rather than using the as-processed zirconia-hafnia powder.

Figure 4:
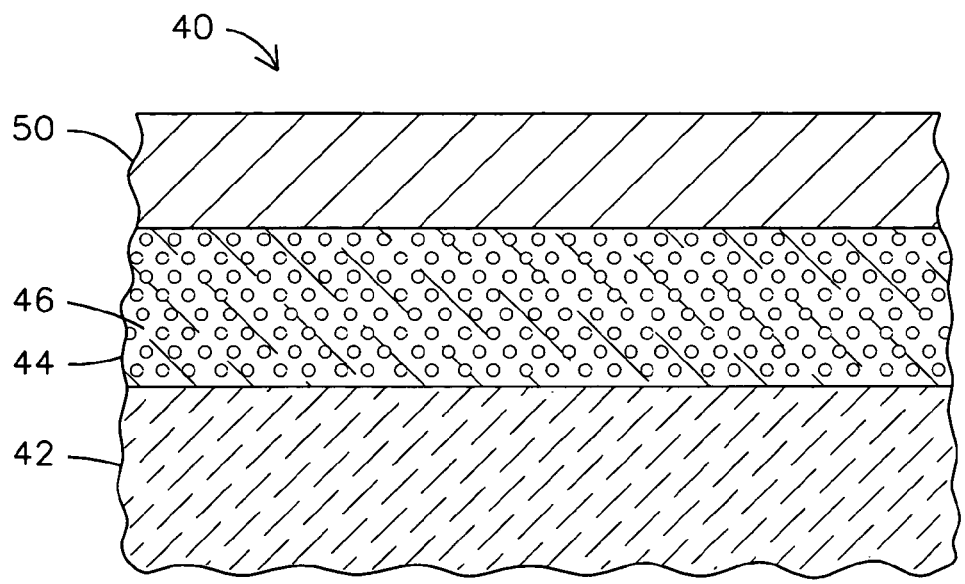
FIG. 4 is a partial cross-sectional view of a component formed of a ceramic matrix composite substrate material covered with a ceramic oxide insulating material, which in turn is protected by a vapor resistance layer.

In another exemplary embodiment, monoclinic zirconia-hafnia may be used as a vapor resistance layer for ceramics and ceramic matrix composite materials. FIG. 4 is a partial cross-sectional view of a component 40 of a gas turbine engine. The component 40 is formed of a substrate 42 of a ceramic matrix composite material that is thermally protected by a ceramic insulating material 44. The ceramic matrix composite substrate 42 and ceramic insulating material 44 may be of the type described in U.S. Pat. No. 6,013,592 discussed above. Ceramic insulating material 44 is an oxide based ceramic including a matrix material 46 surrounding a plurality of mullite spheres 48. The matrix material 46 may include a mullite filler powder and a phosphate binder or an alumina filler powder and an alumina binder. The mullite-based ceramic insulating material 44 would be susceptible to silica loss and/or recession if it were exposed to a typical gas turbine combustion environment containing water vapor at high temperatures, high pressures and high flow rates. Accordingly, a protective vapor resistance layer (VRL) 50 is disposed over the ceramic insulating coating 44 to isolate the ceramic insulating material 44 from water vapor contained in the hot gas environment in which component 40 is designed to operate. The protective vapor resistance layer 50 is a monoclinic zirconia-rich hafnia applied to a desired thickness by any known deposition process, such as slurry coating, sol-gel, chemical vapor deposition, physical vapor deposition or plasma spray. As described above, the mol percentage of hafnia in the layer 50 may range from 50-95 mol % depending upon the requirements of the particular application to minimize any problem resulting from a transformation from the monoclinic phase to the tetragonal phase during the use of the component 40. The protective vapor resistance layer 50 may be 100% zirconia-hafnia or it may be a composite of zirconia-hafnia and alumina, with the percentage of alumina ranging from 0 to approximately 100%. Advantageously, the VRL need not perform the function of an environmental barrier coating (EBC) when used to protect an oxide-based ceramic material and/or under layer, and thus it may have certain processing and cost advantages when compared to prior art EBC's. Prior art EBC's are intended to be hermetic multilayer coating systems used to prevent oxidation and water vapor degradation of a non-oxide substrate, such as a non-oxide CMC. Prior art EBC's typically have a thickness of ≧1 mm. The VRL of the present invention is used to protect an oxide-based ceramic from high temperature water vapor attack. Because the oxide-based material and/or under layer is not subject to oxidation, the VRL need not be a hermetic coating. Also, since water vapor attack occurs primarily at the surface, porosity in the VRL is not only acceptable, but it can actually be advantageous because it increases the mechanical compliance of the coating with the underlying substrate. Porosity of the VRL may be as low as 10% or 15% and may be as high as 35% or 40% or 50%, and anywhere within the various ranges between any combination of these respective upper and lower limits. Compliance is further enhanced because the VRL may be made as thin as possible while still providing the desired protective function. A VRL may typically have a thickness of ≦0.8 mm, moreover, a thickness as small as about 0.01 mm may perform adequately in many applications while still providing adequate service life. In various embodiments the VRL may have a thickness as small as 0.01 mm or 0.05 mm or 0.1 mm and a thickness of as large as 0.5 mm or 0.6 mm or 0.75 mm or 0.8 mm, and anywhere within the various ranges between any combination of these respective upper and lower limits.

Figure 5:
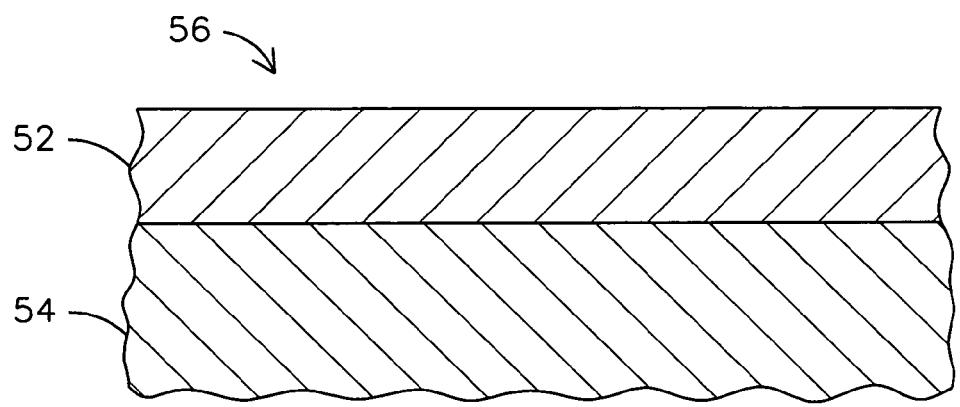
FIG. 5. is a partial cross-sectional view of a refractory oxide ceramic combustor tile formed of a ceramic oxide protected by a vapor resistance layer.

FIG. 5 illustrates a vapor resistance layer of zirconia-hafnia 52 disposed over a ceramic oxide substrate 54 to form a refractory oxide ceramic combustor tile 56. The ceramic oxide substrate 52 may be mullite, zircon, an aluminosilicate or mixtures thereof, for example. Layer 52 may be deposited by slurry coating, sol-gel, chemical vapor deposition, physical vapor deposition or plasma spray. The VRL 52 may be formed to have a porosity of greater than 10%, or preferably greater than 15%, in order to provide the material with an improved resistance to thermal shock loadings. Such porosity is not problematic in this embodiment since the underlying oxide material is not vulnerable to oxidation attack, and is only vulnerable to high velocity water vapor attack. Furthermore, the thickness of layer 52 of greater than 0.1 mm or 0.01-0.8 mm in various embodiments ensures protection against moisture penetration in spite of such porosity, and it provides additional margin against erosion of the protective vapor resistance layer 52. The layer of zirconia-hafnia 52 acts as a barrier for the underlying ceramic oxide substrate 54 against a high temperature, high flow rate, moisture-bearing operating environment. The mole percentage of hafnia in the layer 52 is selected to eliminate or minimize phase changes during high temperature operation. The layer of monoclinic zirconia-hafnia 52 also acts as a barrier for the underlying ceramic oxide substrate 54 in combustion type applications, such as gas turbines, where degradation of the underlying ceramic oxide substrate 54 would be further accelerated by high gas pressures.

Figure 6:
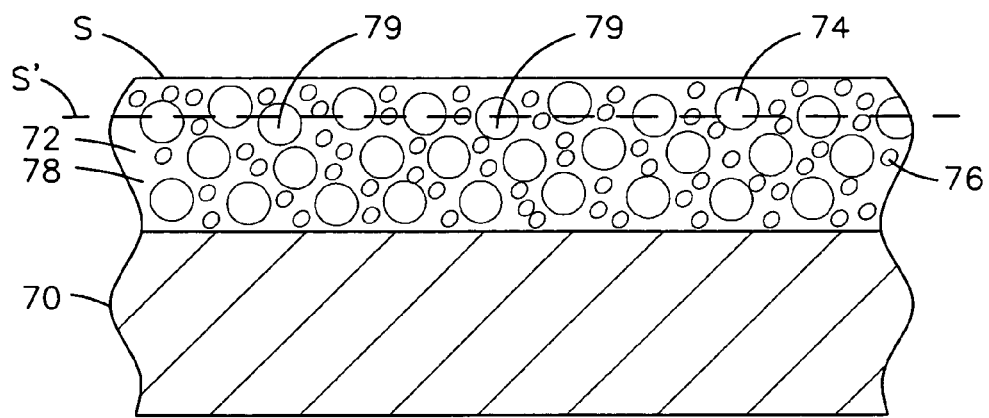
FIGS. 6 and 7 illustrate steps in a method of applying a vapor resistance layer to a ceramic insulating material.
Figure 7:
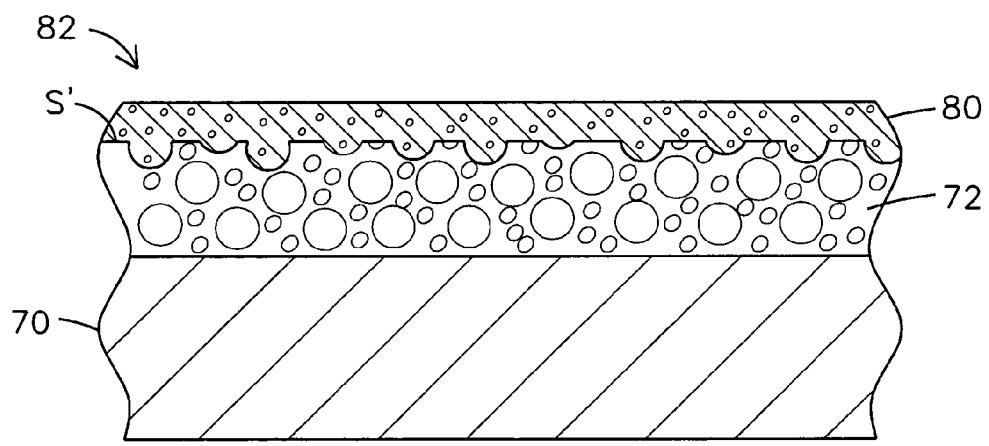

Reference is now made to FIGS. 6 and 7 for describing a method of applying a vapor resistance layer to a ceramic insulation material for use in a high temperature, moisture-containing environment such as in a gas turbine engine. A substrate 70, for example a ceramic matrix composite material, is coated with a layer of ceramic insulation 72. The insulation 72 may be a mullite-based material as described in U.S. Pat. No. 6,013,592 or other material as described in U.S. Pat. No. 6,733,907 containing a plurality of hollow oxide shapes 74 in a matrix of filler particles 76 and/or a binder 78. The as-formed surface S of the insulation is prepared for the application of a coating material 80 by the removal of some of the insulation material, such as by machining or grinding for example, to a desired depth to form a fresh surface S'. Significantly, fresh surface S' contains depressions or pits 79 formed by the removal of partial topmost portions of some of the hollow oxide shapes 74. When the fresh surface S' is subsequently coated, as shown in FIG. 8, the VRL coating material 80 extends into and at least partially fills the pits 79, which functions to anchor the layer of coating material 80 onto the layer of insulation 72.

The vapor resistance layer material 80 of FIG. 7 may be a zirconia-hafnia material as described above in order to take advantage of its relatively high monoclinic-tetragonal phase transition temperature. Specific features of the coating material 80 may be manipulated in order to optimize the performance of the coating for a particular environment. In particular, the mole percentage of hafnia, the thickness of the coating, and the porosity of the material are variables that may be controlled synergistically to obtain improved performance. Generally, a thicker coating will provide additional protection against the environment and will provide a margin against the loss of material through erosion or impact damage. However, thick coatings are more subject to adhesion concerns than are thin coatings due to a generally lesser degree of mechanical compliance of a thicker coating layer and due to thermal stresses within the coating and between the coating and the underlying material. Coating material 80 containing hafnia is advantageously used as a vapor resistance layer over a mullite-based insulating material 72, since the coating 80 may be provided with a desired degree of porosity in order to control the elastic modulus of the coating, and oxygen intrusion through such porosity will not be detrimental to the underlying oxide ceramic material. The present invention includes embodiments of zirconia-hafnia coatings having a range of thicknesses, porosity and hafnia mol percentages that provide improved effectiveness in protecting an underlying mullite-based insulation. In various embodiments, the zirconia hafnia coating 80 may have the following features: target nominal thickness=0.1 mm, or in a range from 0.01 mm to 0.8 mm; target porosity=20%, or in a range from 10% to 50%; target hafnia content depending upon gas path temperature. For high temperature applications (1500-1650° C.), a target hafnia content may be 90-98 mol %. For moderate temperature applications (1200-1300° C.), a target hafnia content may be 40-50 mol %. Such coatings will preferably operate in a temperature range (such as 1,600° C. or less) wherein the hafnia remains in a monoclinic phase, or alternatively, wherein only a topmost portion of the coating will undergo a phase change during high temperature operation and no phase change will occur at the surface S' during high temperature operation of an article 82 (such as a gas turbine hot gas path component) formed of the material. Other embodiments may include alumina or other constituents to reduce the elastic modulus of the coating 80 to approximately equal to or less than that of the underlying insulation layer 72. Other embodiments may include a hafnia-containing coating 80 disposed over a mullite-based insulation material 72, wherein the insulation material 72 also contains hafnia and/or hafnia/zirconia particles 18 as described above in regard to FIG. 3. Additional embodiments my include a coating 80 comprised of at least one of $HfSiO_4$, $ZrSiO_4$, $Y_2Si_2O_7$, $Y_2O_3$, $ZrO_2$, $HfO_2$, yttria and or RE partially or fully stabilized $ZrO_2$, yttria and or RE partially or fully stabilized $HfO_2$, yttria and or RE partially or fully stabilized $ZrO_2/HfO_2$, yttrium aluminum garnet YAG; RE silicates of the form $RE_2Si_2O_7$; RE oxides of the form $RE_2O_3$; RE zirconates or hafnates of the form $RE_4Zr_3O_{12}$ or $RE_4Hf_3O_{12}$, where RE may be one or more of Ce, Pr, Nd, Sm, Eu, Gd, Tb, Dy, Ho, Er, Tm, Yb, Lu. The coating may be disposed over an alumina and/or mullite-based insulation material 72, wherein the insulation materials 72 also contains at least one of $HfSiO_4$, $ZrSiO_4$, $Y_2Si2O_7$, $Y_2O_3$, $ZrO_2$, $HfO_2$, yttria and or RE partially or fully stabilized $ZrO_2$, yttria and or RE partially or fully stabilized $HfO_2$, yttria and or RE partially or fully stabilized $ZrO_2/HfO_2$, YAG; rare earth (RE) silicates of the form $RE_2Si_2O_7$; RE oxides of the form $RE_2O_3$; RE zirconates or hafnates of the form $RE_4Zr_3O_{12}$ or $RE_4Hf_3O_{12}$, where RE may be one or more of Ce, Pr, Nd, Sm, Eu, Gd, Tb, Dy, Ho, Er, Tm, Yb, Lu filler particles 20 or mixtures thereof as composite particles 18 or as filler particles 20.

Figure 8:
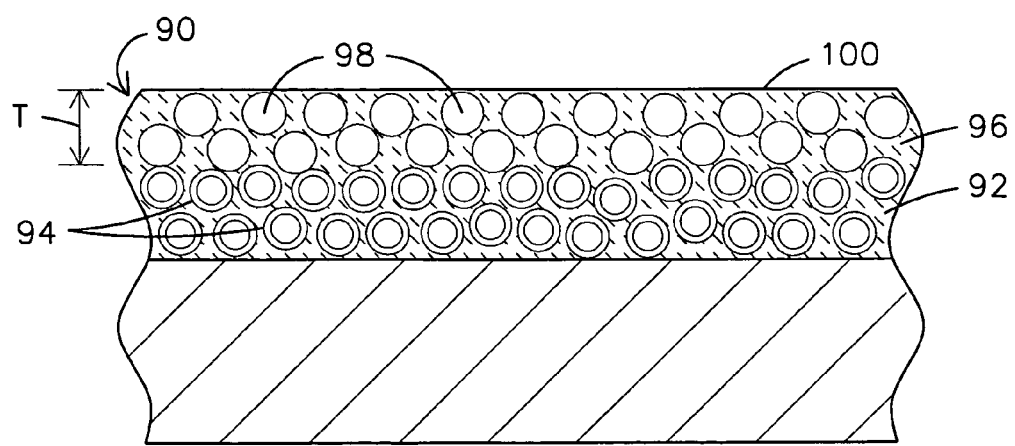
FIG. 8 is a cross-sectional view of a layer of ceramic insulation illustrating an integral vapor resistance layer formed when mullite spheres in an outermost portion of the insulation are lost due to recession.

FIG. 8 illustrates another embodiment of the present invention wherein a vapor resistance layer 90 having a thickness T is integrally formed as a top portion of a layer of ceramic composite insulation 92. The composite insulation includes a plurality of hollow ceramic shapes 94 disposed within a ceramic matrix material 96. The ceramic matrix material 96 may include binder and filler particles (not shown) as described and illustrated above in regard to FIG. 3. The hollow ceramic shapes 94 may be hollow oxide spheres such as the mullite spheres illustrated in FIG. 8. While the mullite spheres are vulnerable to recession/erosion in a combustion environment, the matrix material 96 may be formed of one or more materials that are resistant to such recession/erosion. For example, the matrix material 96 may include at least one of the group of: $HfSiO_4$, $ZrSiO_4$, $Y_2Si2O_7$, $Y_2O_3$, $ZrO_2$, $HfO_2$, yttria and or RE partially or fully stabilized $ZrO_2$, yttria and or RE partially or fully stabilized $HfO_2$, yttria and or RE partially or fully stabilized $ZrO_2/HfO_2$, yttrium aluminum garnet; RE silicates of the form $RE_2Si_2O_7$; RE oxides of the form $RE_2O_3$; RE zirconates or hafnates of the form $RE_4Zr_3O_{12}$ or $RE_4Hf_3O_{12}$, where RE may be one or more of Ce, Pr, Nd, Sm, Eu, Gd, Tb, Dy, Ho, Er, Tm, Yb, Lu. During operation in a combustion product environment, the mullite spheres in the uppermost layer 90 of the insulation 92 are lost due to recession, leaving a plurality of voids 98 in their places. Mullite spheres 94 that are deeper below the surface 100 are protected by the overlying matrix material of layer 90 and are thus not lost to the environment. The insulation 92 thus includes a self-forming vapor resistance layer 90. While the strength of the vapor resistance layer 90 is reduced when compared to the strength of the un-degraded underlying ceramic matrix material 96, it is nonetheless structurally sound because of its limited thickness T and its inherent compliance resulting from its porosity.

While various embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

The invention claimed is:

1. An insulated article comprising:
   an oxide ceramic substrate;
   a vapor resistance layer disposed over the oxide ceramic substrate and comprising a porosity of 10-50% and a thickness of 0.01-0.8 mm; and
   the vapor resistance layer effective to protect the oxide ceramic substrate from recession and erosion due to water vapor damage in a high pressure, high temperature, high velocity, combustion turbine environment;
   wherein the vapor resistance layer comprises zirconia-hafnia comprising a monoclinic crystalline structure comprising 90-98 mol % hafnia.

2. The insulated article of claim 1, wherein the vapor resistance layer comprises a porosity of 15-40%.

3. The insulated article of claim 1, wherein the vapor resistance layer comprises a thickness of 0.05-0.5 mm.

4. The insulated article of claim 1, wherein the vapor resistance layer comprises at least one of the group consisting of: $HfSiO_4$, $ZrSiO_4$, $Y_2Si2O_7$, $Y_2O_3$, $ZrO_2$, $HfO_2$, yttria and or RE partially or fully stabilized $ZrO_2$, yttria and or RE partially or fully stabilized $HfO_2$, yttria and or RE partially or fully stabilized $ZrO_2/HfO_2$, yttrium aluminum garnet; RE silicates of the form $RE_2Si_2O_7$; RE oxides of the form $RE_2O_3$; RE zirconates or hafnates of the form $RE_4Zr_3O_{12}$ or $RE_4Hf_3O_{12}$, where RE may be one or more of Ce, Pr, Nd, Sm, Eu, Gd, Tb, Dy, Ho, Er, Tm, Yb, Lu.

5. The insulated article of claim 1, wherein the oxide ceramic substrate comprises a ceramic composite layer comprising a plurality of hollow oxide shapes and oxide filler particles disposed in a binder.

6. The insulated article of claim 5, wherein a surface of the ceramic composite layer in contact with the vapor resistance layer comprises a plurality of pits created by a removal of partial topmost portions of a portion of the hollow oxide shapes, the vapor resistance layer extending into and at least partially filling the pits.

7. The insulated article of claim 5, wherein the oxide filler particles comprise particles of zirconia-hafnia comprising an average size of greater than 15 microns.

8. The insulated article of claim 5, wherein the oxide filler particles comprise particles of zirconia-hafnia and alumina and exhibiting micro-cracks contained within the particles and not propagated into the binder.

9. An insulation comprising:
   a ceramic composite layer comprising a plurality of hollow shapes disposed in a binding matrix;
   a surface of the ceramic composite layer comprising a plurality of pits created by a removal of partial topmost portions of respective ones of the hollow shapes; and
   a layer of ceramic coating material disposed on the surface of the ceramic composite layer and anchored to the ceramic composite layer by the coating material extending into the pits.

10. The insulation of claim 9, wherein the layer of ceramic coating material comprises a vapor resistance layer comprising porosity in the range of 10-40% and a thickness of 0.05-0.5 mm.

11. The insulation of claim 10, wherein the vapor resistance layer comprises zirconia-hafnia.

12. The insulation of claim 10, wherein the vapor resistance layer comprises at least one of the group consisting of: $HfSiO_4$, $ZrSiO_4$, $Y_2Si2O_7$, $Y_2O_3$, $ZrO_2$, $HfO_2$, yttria and or RE partially or fully stabilized $ZrO_2$, yttria and or RE partially or fully stabilized $HfO_2$, yttria and or RE partially or fully stabilized $ZrO_2/HfO_2$, yttrium aluminum garnet; RE silicates of the form $RE_2Si_2O_7$; RE oxides of the form $RE_2O_3$; RE zirconates or hafnates of the form $RE_4Zr_3O_{12}$ or $RE_4Hf_3O_{12}$, where RE may be one or more of Ce, Pr, Nd, Sm, Eu, Gd, Tb, Dy, Ho, Er, Tm, Yb, Lu.

13. The insulation of claim 9, wherein the ceramic composite layer comprises filler powder and a binder material, the filler powder comprising particles comprising zirconia-hafnia having an average size of greater than 15 microns and exhibiting micro-cracks contained within the particles and not propagating into the binder material.

14. The insulation of claim 9, wherein the ceramic composite layer comprises composite particles comprising zirconia-hafnia and alumina exhibiting micro-cracking within the particles resulting from differential thermal expansion among the particle constituents.

15. The insulation of claim 9, wherein the ceramic composite layer comprises at least one of the group consisting of: $HfSiO_4$, $ZrSiO_4$, $Y_2Si_2O_7$, $Y_2O_3$, $ZrO_2$, $HfO_2$, yttria and or RE partially or fully stabilized $ZrO_2$, yttria and or RE partially or fully stabilized $HfO_2$, yttria and or RE partially or fully stabilized $ZrO_2/HfO_2$, yttrium aluminum garnet; RE silicates of the form $RE_2Si_2O_7$; RE oxides of the form $RE_2O_3$; RE zirconates or hafnates of the form $RE_4Zr_3O_{12}$ or $RE_4Hf_3O_{12}$, where RE may be one or more of Ce, Pr, Nd, Sm, Eu, Gd, Tb, Dy, Ho, Er, Tm, Yb, Lu.

* * * * *